June 28, 1966  N. P. MILLIGAN  3,258,668

MOTOR STARTER CIRCUIT

Filed March 25, 1963

INVENTOR.
NEAL P. MILLIGAN

BY

*Barnes, Kisselle, Raisch & Choate*

ATTORNEYS

United States Patent Office 3,258,668
Patented June 28, 1966

3,258,668
MOTOR STARTER CIRCUIT
Neal P. Milligan, Columbus, Ohio, assignor to Tecumseh Products Company, Tecumseh, Mich., a corporation of Michigan
Filed Mar. 25, 1963, Ser. No. 267,603
8 Claims. (Cl. 318—221)

This invention relates to a switching circuit for selectively energizing an alternating-current capacitance load and in particular to a switching circuit for energizing the start winding of a single phase capacitor-start motor when the motor is being started.

Single phase induction motors require substantial starting torque. Conventionally the required starting torque is obtained by connecting a capacitor in series with a separate start winding to provide a large phase shift between the start current in the start winding and the start current in a main winding. This starting capacitor is switched out of the start winding circuit when the motor is running. In capacitor-start, capacitor-run motors the start winding circuit may include a pair of parallel capacitors, one of which is switched out of the circuit when the motor is running. With both types of motors either a centrifugal switch responsive to motor speed or current and voltage operated start relays are conventionally used to switch the start capacitor in and out of the start winding circuit.

The objects of this invention are to provide an electronic switching circuit that replaces mechanical starting switches; that eliminates undesirable arcing; that is simple, dependable, maintenance free and economically practical; and that is especially adapted for use with a capacitance load such as the start winding circuit of capacitor-start motors.

Figure 1:
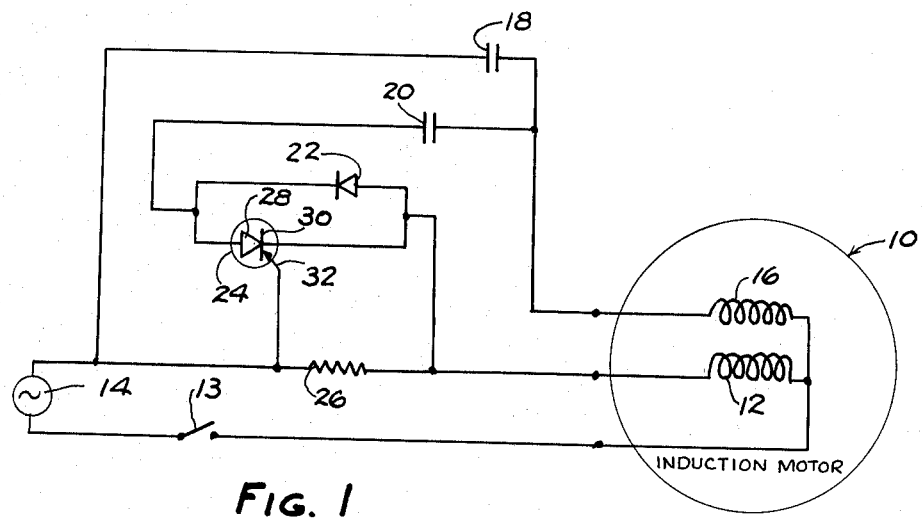
FIG. 1 is a schematic circuit diagram of a switching circuit comprising a single diode and a single silicon controlled rectifier to selectively energize the capacitance start winding of a single phase induction motor.

FIG. 1 shows a capacitor-start, capacitor-run motor 10 having a main winding 12 energized by an alternating current source 14 through on-off switch 13. Motor 10 also has a conventional start winding 16 positioned in space quadrature with main winding 12 and energized by source 14 through a first circuit comprising a run capacitor 18 and a second circuit comprising a start capacitor 20, a pair of rectifiers 22, 24 and a resistor 26. Rectifier 24 is a silicon controlled rectifier having an anode 28, a cathode 30 and a control electrode 32. Cathode 30 and control electrode 32 are directly connected to opposite ends of resistor 26. Rectifier 22 is a diode. Rectifiers 22, 24 are reversely connected in parallel to provide a full wave output to capacitor 20 and start winding 16 when rectifier 24 is turned on by a gating signal derived from resistor 26.

Figure 2:
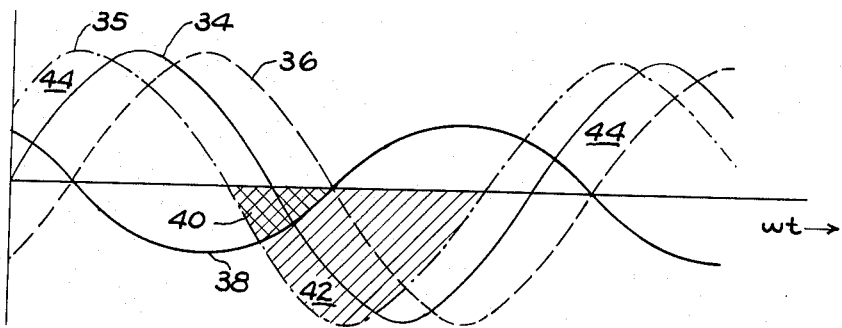
FIG. 2 is an exemplary wave form diagram (not to scale), illustrating the triggering and conducting periods for the silicon controlled rectifier.

When switch 13 is closed to start motor 10, an initial surge current flows through main winding 12 and resistor 26. The magnitude of this initial surge current is substantially greater in magnitude than the normal running current due to the low effective impedance of winding 12 when the rotor of motor 10 is standing still. This initial surge current produces a voltage drop across resistor 26 that is properly phased and of sufficient magnitude to fire rectifier 24. FIG. 2 shows exemplary phasing between the input voltage 34, the cathode-anode voltage 35 across rectifier 24, the initial surge current 36 through main winding 12, and the cathode-control electrode gating signal 38 across resistor 26. It is to be understood, however, that the phasing will vary considerably from start to run conditions and also between different motor designs. In FIG. 2 the input voltage 34 is positive when the upper terminal of source 14 as viewed in FIG. 1 is positive with respect to the lower terminal. As illustrated in FIG. 2 the initial surge current 36 in winding 12 may lag the input voltage 34 by 35 to 45 degrees; the cathode-anode voltage 35 is in phase with the capacitor current and leads input voltage 34; the cathode-control electrode gating signal 38 is 180 degrees out of phase with surge current 36 to forward bias control electrode 32 when anode 28 is forward biased to fire rectifier 24. The firing condition for rectifier 24 is indicated by the cross-hatched portion 40. Rectifier 24 fires at or near the beginning of each half cycle when anode 28 is forward biased and will remain conducting during the remainder of half cycle 42 shown lined in FIG. 2. Rectifier 22 conducts during alternate half cycles 44. Capacitor 20 is therefore charged in one direction through start winding 16 and rectifier 22 during one half cycle, and then discharged and recharged in the opposite direction through start winding 16 and rectifier 24 on opposite polarity half cycles. The alternate charging and discharging of capacitor 20 energizes start winding 16 with an alternating current, phase shifted by capacitor 20 with respect to the current in main winding 12. The combined phase shifted current through capacitors 20 and 18 provides the required starting torque. As motor 10 speeds up the magnitude of current in winding 12 decreases. When normal running speeds are approached the current in resistor 26 will not provide a forward bias sufficient to gate rectifier 24 into conduction. Therefore as motor 10 reaches running speeds, start winding 16 will not be energized by alternating current through start capacitor 20 since rectifier 24 is maintained non-conducting. Capacitor 18 remains in the circuit for a capacitor-run condition and has a value such that resonance will occur at approximately running speeds. The capacitance of capacitor 20 is ordinarily ten times larger than that of capacitor 18 to approximate resonance at zero motor speed. Although a capacitor-start, capacitor-run, induction motor circuit has been disclosed, some motor designs do not require the run capacitor 18.

Figure 3:
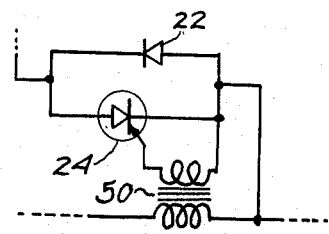
FIG. 3 illustrates an alternative embodiment where a pulse transformer is used in the gating circuit for the silicon controlled rectifier shown in FIG. 1.

FIG. 3 is a fragmentary view illustrating a modified gating circuit for rectifier 24. This embodiment is used in a circuit identical to the circuit shown in FIG. 1 except that resistor 26 (FIG. 1) is replaced by a pulse transformer 50. This embodiment is especially useful where the motor design requires additional circuitry to adjust the phase of the gating voltage on control electrode 32. The use of a transformer is also important with larger size motors to eliminate the dissipation which would occur in resistor 26 at locked rotor conditions. Of course rectifier 24 could be fired from any properly phase source including an external triggering device.

By way of example and not of limitation, with a 1/12 H.P. compressor motor used for marine applications where explosion-proof starting is required, the components used in a circuit of the type shown in FIG. 1 had the following values.

Inductance of main
 winding 12 _____ From 0.044 henry to 0.4
                       henry (variation between
                       locked rotor and run conditions).
Inductance of start
 winding 16 _____ From 0.042 henry to 0.4
                       henry (variation between

| | |
|---|---|
| Resistor 26 | 0.2 ohms. |
| Source 14 | 120 volts, 60 cycles. |
| Rectifier 24 | General Electric C-15 700 VPIV. |
| Rectifier 22 | 5 amp. silicon 700 VPIV. |
| Capacitor 20 | 75 mfd. 250 VAC. |
| Capacitor 18 | Not used. |

For this arrangement, the initial start current through winding 16 will lead the surge current in main winding 12 by approximately 90 degrees to provide maximum starting torque.

I claim:

1. In combination an alternating current source, a load, a capacitor and a switching circuit for selectively connecting said source to said load through said capacitor, said switching circuit comprising an electron device in circuit with said source and said capacitor for discharging and charging said capacitor through said load on one half cycle of said source, said electron device having a conductive condition and a nonconductive condition and having a control portion for switching the same between said conditions, and a diode rectifier in circuit with said source and said capacitor for discharging and charging said capacitor through said load on alternate half cycles of said source, and means for selectively energizing said control portion of said electron device, said load being alternating current energized through said capacitor only when said electron device is energized with sufficient voltage to render the same conductive.

2. In combination a single phase induction motor of the type having a main winding and a start winding, an alternating current source, a switching circuit for selectively connecting said start winding to said source, and a capacitor connected in series with said source, said switching circuit and said start winding, said switching circuit comprising a controlled rectifier having an anode-to-cathode portion coupled to said source and to said capacitor for discharging and charging said capacitor to a first polarity through said start winding on one half cycle of said alternating source, said controlled rectifier further having a gate portion for controlling the conduction of said controlled rectifier, and a diode rectifier connected across said anode-to-cathode portion of said controlled rectifier for discharging said capacitor and charging the same to the opposite polarity through said start winding on alternate half cycles of said source, and means for selectively energizing said gate portion of said controlled rectifier, said start winding being alternating current energized through said capacitor only when said gate portion is energized with sufficient voltage to render said controlled rectifier conductive on one half cycle of said alternating source.

3. The combination set forth in claim 2 wherein said selectively energizing means is connected in circuit with said main winding and said controlled rectifier is selectively energized in accordance with current flow in said main winding.

4. The combination set forth in claim 3 wherein said selectively energizing means comprises an impedance connected in series with said start winding.

5. A switching circuit comprising a pair of input terminals, a pair of output terminals, a pair of rectifiers and a capacitor, one of said rectifiers having anode, cathode and control electrodes, and the other of said rectifiers having only anode and cathode electrodes, said rectifiers being reversely connected in parallel, said parallel rectifiers being connected in series with said capacitor between one terminal of each of said input and output pairs of terminals.

6. In combination a single phase induction motor of the type having a main winding and a start winding, an alternating current source, a start winding capacitor, a switching circuit for selectively connecting said start winding to said source, and control signal means, said switching circuit comprising a pair of rectifiers, one of said rectifiers having an anode, a cathode and a control electrode, and the other of said rectifiers having only an anode and a cathode, said rectifiers being reversely connected in parallel, said parallel rectifiers being connected in series with said capacitor and said start winding across said source, and means for applying a control signal from said control signal means to said control electrode.

7. In combination a motor having a main winding and a start winding, a start winding capacitor, a switching circuit adapted to selectively connect said start winding to a source of alternating current, and control signal means, said switching circuit comprising a pair of semiconductor rectifiers, one of said rectifiers having an anode, a cathode and a control electrode, the other of said rectifiers having only an anode and a cathode, said rectifiers being reversely connected in parallel, said parallel rectifiers being connected in series with said capacitor and said start winding, said control signal means being connected in circuit with said main winding and said control electrode of said one rectifier for controlling the conductivity of said one rectifier in response to current flow in said main winding when said main winding is energized.

8. In the circuit for use in starting a motor having a main winding and a start winding the combination comprising a pair of input terminals adapted to be connected to an alternating current source, a first pair of output terminals adapted to be connected to said start winding, a second pair of output terminals adapted to be connected to said main winding, a pair of rectifiers, one of said rectifiers having an anode, a cathode and a control electrode, the other of said rectifiers having only an anode and a cathode, said rectifiers being reversely connected in parallel, said parallel rectifiers being connected between one of said input terminals and one terminal of said first pair of output terminals, a capacitor connected in series with said parallel rectifiers between one of said input terminals and one terminal of said pair of output terminals, an impedance connected between one of said input terminals and one terminal of said second pair of output terminals, and means for controlling the conductivity of said one rectifier in response to current flow in said main winding when said main winding is energized, said control means being coupled between said impedance and said control electrode of said one rectifier.

References Cited by the Examiner

UNITED STATES PATENTS 3,071,717  1/1963  Gordon _____ 318—221
3,071,718  1/1963  Gordon _____ 318—221 X ORIS L. RADER, *Primary Examiner.*

C. E. ROHRER, G. Z. RUBINSON, *Assistant Examiners.*